(12) United States Patent
Hollstein

(10) Patent No.: US 8,058,327 B2
(45) Date of Patent: Nov. 15, 2011

(54) COMPOSITION

(75) Inventor: Werner Hollstein, Schliengen (DE)

(73) Assignee: Huntsman International LLC, The Woodlands, TX (US)

( * ) Notice: Subject to any disclaimer, the term of this patent is extended or adjusted under 35 U.S.C. 154(b) by 105 days.

(21) Appl. No.: 11/996,824

(22) PCT Filed: Jul. 14, 2006

(86) PCT No.: PCT/EP2006/064291
§ 371 (c)(1), (2), (4) Date: Jan. 25, 2008

(87) PCT Pub. No.: WO2007/012577
PCT Pub. Date: Feb. 1, 2007

(65) Prior Publication Data
US 2008/0211142 A1    Sep. 4, 2008

(30) Foreign Application Priority Data
Jul. 26, 2005 (EP) .................................. 05106850

(51) Int. Cl.
*C08G 59/50* (2006.01)
*C08G 63/00* (2006.01)

(52) U.S. Cl. .................... 523/400; 264/331.12

(58) Field of Classification Search ........................ None
See application file for complete search history.

(56) References Cited

U.S. PATENT DOCUMENTS

| | | |
|---|---|---|
| 5,013,814 A | 5/1991 | Roth et al. |
| 5,324,767 A | 6/1994 | Koyama et al. |
| 6,191,675 B1 | 2/2001 | Sudo et al. |
| 2004/0039084 A1 * | 2/2004 | Beisele ......................... 523/201 |

FOREIGN PATENT DOCUMENTS

EP    0073736    3/1983

* cited by examiner

*Primary Examiner* — Monica A Huson

(57) ABSTRACT

The instant invention relates to highly filled epoxy resin compositions suitable as casting resins without the need of an extended curing step, to a casting process using said compositions and use of said compositions in a casting process not needing an extended curing step.

11 Claims, No Drawings

COMPOSITION

CROSS REFERENCE TO RELATED APPLICATIONS

This application is the National Phase of International Application PCT/EP2006/064291 filed Jul. 14, 2006 which designated the U.S. and which claims priority to European Patent Application (EP) 05106850.0 filed Jul. 26, 2005. The noted applications are incorporated herein by reference.

TECHNICAL FIELD

This invention relates to highly filled epoxy resin compositions suitable as casting resins without the need of an extended curing step, to a casting process using said compositions and use of said compositions in a casting process not needing an extended curing step.

BACKGROUND OF THE INVENTION

Highly filled epoxy resin compositions are widely used in casting processes, for example for car ignition coils. In view of the large number of castings, it is essential that the curing occurs rapidly but on the other hand all gaps need to be filled. Processes used up to now always require an extended curing step of several hours at temperatures above 100° C., for example U.S. Pat. No. 6,191,675.

Furthermore, it is known to use sulfonium salts as curing agents or curing accelerators in the heat-curing of cationically polymerizable organic compounds, in particular epoxy resins. For example, U.S. Pat. No. 5,013,814 describes such compositions.

Therefore, there is a need for highly filled epoxy resin compositions having good processing properties, such as sedimentation stability, viscosity (less than 2000 mPa s, T: 60° C., D: 50 s$^{-1}$), impregnation behaviour of high voltage windings, gap filling behaviour, and requiring only a short curing step not exceeding 1 hour.

SUMMARY OF THE INVENTION

It now has surprisingly been found that epoxy resin compositions, as described in detail hereafter, allow a casting process to be carried out with a total curing time not exceeding 1 hour at temperatures below 160° C.

DETAILED DESCRIPTION OF THE INVENTION

The present invention thus relates to epoxy resin compositions comprising
(a) an epoxy resin having on average more than one 1,2-epoxide group in the molecule;
(b) a hardener-accelerator system comprising
 (b1) a polycarboxylic acid anhydride; and
 (b2) a sulfonium salt; and
(c) a non-alkaline, inorganic filler present as a mixture of at least two different particle sizes whereby the larger particles have a D50-value of between 11 and 25 μm and the smaller particles have a D50-value of between 4 and 10 μm and whereby the amount by weight of the filler having the larger particle sizes is at least twice the amount by weight of the filler having the smaller particle sizes. In a preferred embodiment, the hardener system consists essentially of (b1) a polycarboxylic acid anhydride and (b2) a sulfonium salt.

The epoxy resin is liquid at room temperature (23° C.) or it can be liquefied at the processing temperature of the casting process according to the invention.

The compositions according to the invention preferably comprise, as the epoxy resin (a), di- or polyepoxide compounds, in particular aliphatic, cycloaliphatic or aromatic di- or polyepoxide compounds or mixtures thereof.

All types of epoxy resins are suitable for the present invention. Examples are epoxy resins which contain groups of formula A

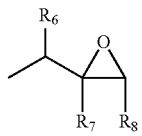

in which either $R^6$ and $R^8$ are each a hydrogen atom, in which case $R^7$ is then a hydrogen atom or a methyl group or $R^6$ and $R^8$ together are —$CH_2$—$CH_2$ or —$CH_2$—$CH_2$—$CH_2$— forming a five- or six-membered ring.
in which case $R^7$ is then a hydrogen atom. bonded directly to oxygen, nitrogen or sulfur atoms are suitable as the epoxy resin (a).

Examples which may be mentioned of such resins are polyglycidyl esters and poly-(beta-methylglycidyl) esters, which can be obtained by reaction of a compound containing two or more carboxylic acid groups per molecule with epichlorohydrin, glycerol dichlorohydrin or beta-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Other examples are polyglycidyl ethers and poly-(beta-methylglycidyl)ethers which are obtainable by reaction of a compound containing at least two free alcoholic and/or phenolic hydroxyl groups per molecule with the corresponding epichlorohydrin under alkaline conditions, or in the presence of an acid catalyst, with subsequent treatment with an alkali. These ethers can be prepared with poly-(epichlorohydrin) from acyclic alcohols, such as ethylene glycol, diethylene glycol and higher poly-(oxyethylene) glycols, propane-1,2-diol and poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols having aromatic nuclei, such as N,N-bis(2-hydroxyethyl)-aniline and p,p'-bis-(2-hydroxyethylamino)-diphenylmethane. They can furthermore be prepared from mononuclear phenols, such as resorcinol and hydroquinone, as well as polynuclear phenols, such as bis-(4-hydroxyphenyl)-methane, 4,4-dihydroxydiphenyl, bis-(4-hydroxyphenyl) sulfone, 1,1,2,2-tetrakis-(4-hydroxyphenyl)-ethane, 2,2-bis(4-hydroxyphenyl)-propane (otherwise known as bisphenol A) and 2,2-bis-(3,5-dibromo-4-hydroxyphenyl)-propane, as well as novolaks formed from aldehydes, such as formaldehyde, acetaldehyde, chloral and furfurol, with phenols, such as phenol itself and phenol which is substituted on the ring by chlorine atoms or alkyl groups having in each case up to nine carbon atoms, such as 4-chlorophenol, 2-methylphenol and 4-tert-butylphenol.

Poly-(N-glycidyl) compounds include, for example, triglycidyl isocyanurate and N,N'-diglycidyl derivatives of cyclic alkyleneureas, such as ethyleneurea and 1,3-propyleneurea, and hydantoins, such as 5,5-dimethylhydantoin.

Poly-(S-glycidyl) compounds are, for example, the di-S-glycidyl derivatives of dithiols, such as ethane-1,2-dithiol and bis-(4-mercaptomethylphenyl)ether.

Examples of epoxy group containing resins according to formula A, in which $R^6$ and $R^8$ together are a —$CH_2$—$CH_2$— or —$CH_2$—$CH_2$—$CH_2$—, thus forming a five- or six-membered ring, are bis-(2,3-epoxycyclopentyl)ether, 2,3-epoxycyclopentyl glycidyl ether, 1,2-bis-(2,3-epoxycyclopentyloxy)-ethane and 3,4-epoxycyclohexylmethyl 2',4'-epoxycyclohexanecarboxylate.

Epoxy resins in which the 1,2-epoxide groups are bonded to different types of hetero atoms, for example the N,N,O-triglycidyl derivative of 4-aminophenol, the glycidyl ether/glycidyl ester of salicyclic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidyl-3-hydantoinyl)-propane, are also suitable.

Aromatic epoxy resins, such as novolak epoxy resins or diglycidyl ethers of bisphenols, are specifically preferred.

Especially suitable epoxy resins are in particular such resins which are liquid and show a viscosity of less than 1000 mPa·s at the processing a temperature of about 40 to 100° C. (method: Brookfield, spindle 1, 10 rpm).

The compositions according to the invention preferably comprise, as the anhydride (b1), an anhydride of an aliphatic polycarboxylic acid such as maleic acid, oxalic acid, succinic acid, nonyl- or dodecylsuccinic acid, glutaric acid, adipic acid, pimelic acid, suberic acid, azelaic acid or dimerised or trimerised linoleic acid, a cycloaliphatic polycarboxylic acid such as tetrahydrophthalic acid, methylenedimethylenetetrahydrophthalic acid, hexachloroendo-methylenetetrahydrophthalic acid, 4-methyltetrahydrophthalic acid, hexahydrophthalic acid, or 4-methylhexahydrophthalic acid, an aromatic polycarboxylic acid such as phthalic acid, isophthalic acid, terephthalic acid, trimellitic acid, pyromellitic acid or benzophenone-3,3',4,4'-tetracarboxylic acid, or mixtures thereof.

In particular, component (b1) is a 4-methyltetrahydrophthalic anhydride, 4-methylhexahydrophthalic anhydride or a mixture thereof.

Preferred polycarboxylic acid anhydrides are liquid (viscosity below 500 mPa·s, method: Brookfield, spindle 1, 10 rpm) at the processing temperature of about 40 to 100° C.

The compositions according to the invention preferably comprise, as the sulfonium salt (b2), for example a compound of the formulae (I) to (V)

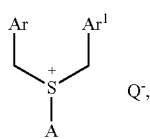

(I)

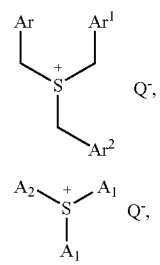

(II)

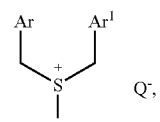

(III)

Ar—$CH_2$—$S^+$(A)-$CH_2$-Arylen-$CH_2$—$S^+$(A)-$CH_2$—
$Ar^1 2Q^-$ (IV) or

Ar—$CH_2$—$S^+$(—$CH_2$-A)-$CH_2$-Arylen-$CH_2$—$S^+$(—
$CH_2$-A)-$CH_2$—$Ar^1 2Q^-$ (V), in which A is $C_1$-$C_{12}$ alkyl, $C_3$-$C_8$ cycloalkyl, $C_4$-$C_{10}$ cycloalkylalkyl, phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

Ar, $Ar^1$ and $Ar^2$, independently of one another, are each phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms or is naphthyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

arylene is phenylene which is unsubstituted or mono- or polysubstituted by CL-CS alkyl, $C_1$-$C_4$ alkoxy, halogen, nitro, phenyl, phenoxy, alkoxycarbonyl having 1-4 C atoms in the alkoxy radical or acyl having 1-12 C atoms or naphthylene which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

Q is $SbF_6$, $AsF_5$ or $SbF_5OH$, $A_1$ has independently the meaning of Ar, and $A_2$ $C_1$-$C_{12}$ alkyl, $C_3$-$C_8$ cycloalkyl, $C_4$-$C_{10}$ cycloalkylalkyl.

Component (b2) is preferably a sulfonium salt of the formulae (I) or (II)

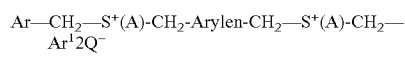

(I)

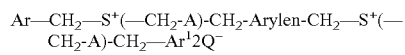

(II)

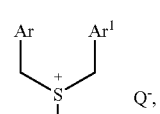

(III)

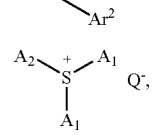

in which A is $C_1$-$C_{12}$ alkyl, $C_3$-$C_5$ cycloalkyl, $C_4$-$C_{10}$ cycloalkylalkyl, phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

Ar, $Ar^1$ and $Ar^2$, independently of one another, are each phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms, or is naphthyl which is unsubstituted or mono- or polysubstituted by $C_1$-$C_8$ alkyl, $C_1$-$C_4$ alkoxy, halogen, nitro, phenyl, phenoxy, alkoxycarbonyl having 14 C atoms in the alkoxy radical or acyl having 1-12 C atoms;

$A_1$ has independently the meaning of Ar, $A_2$ $C_1$-$C_{12}$ alkyl, $C_3$-$C_8$ cycloalkyl, $C_4$-$C_{10}$ cycloalkylalkyl, and Q is $SbF_6$, $AsF_6$ or $SbF_5OH$.

Preferably, A is $C_1$-$C_{12}$ alkyl or phenyl which is unsubstituted or substituted by halogen or $C_1$-$C_4$ alkyl, Ar, $Ar^1$ and $Ar^2$, independently of one another, are each phenyl which is unsubstituted or mono- or polysubstituted by $C_1$-$C_8$ alkyl, $C_1$-$C_4$ alkoxy, Cl or Br, and Q is $SbF_6$ or $SbF_5OH$, for example dibenzylethylsulfonium hexafluoroantimonate.

Particularly preferred sulfonium salts are those of the formula (I) in which A, $Ar^1$ and $Ar^2$, independently of one another, are each phenyl which is unsubstituted or substituted by $C_1$-$C_8$ alkyl, $C_1$-$C_4$ alkoxy, Cl or Br and Q is $SbF_6$ or $SbF_5OH$, such as in particular dibenzyl phenylsulfonium hexafluoroantimonate.

$C_1$-$C_{12}$ alkyl as A can be straight-chain or branched. For example, A can be methyl, ethyl, isopropyl, n-butyl, sec-butyl, tert-butyl, n-octyl or n-dodecyl.

Examples of suitable cycloalkyls are cyclopropyl, cyclopentyl, cyclohexyl, and cyclooctyl.

Examples of suitable cycloalkylalkyls are cyclohexylmethyl and cyclohexylethyl.

A substituted phenyl or naphthyl as A, Ar, $Ar^1$ and $Ar^2$ can be identically or differently substituted phenyl or naphthyl. Examples are p-tolyl, xylyl, ethylphenyl, methoxyphenyl, ethoxyphenyl, p-chlorophenyl, 2,4-, 3,4- or 2,6-dichlorophenyl, bromophenyl, acetylphenyl, trimethylphenyl, methylnaphthyl, methoxynaphthyl, ethoxynaphthyl, chloronaphthyl, bromonaphthyl and biphenyl.

A substituted phenylene or naphthylene as arylene can be, for example, methylphenylene, ethylphenylene, methoxyphenylene, ethoxyphenylene, chlorophenylene, dichlorophenylene, bromophenylene, acetylphenylene, trimethylphenylene, methylnaphthylene, methoxynaphthylene, ethoxynaphthylene, chloronaphthylene or bromonaphthylene. Preferably, arylene is an unsubstituted phenylene or naphthylene.

Examples of the aromatic sulfonium salt of the formula (I) are benzyl-4-hydroxyphenylmethyl-sulfonium hexafluoroantimonate, benzyl-4-hydroxyphenylmethylsulfonium hexafluorophosphate, 4-acetoxyphenylbenzylmethylsulfonium hexafluoroantimonate, 4-acetoxyphenyl-dimethylsulfonium hexafluoroantimonate, benzyl-4-methoxyphenylmethylsulfonium hexafluoroantimonate, benzyl-2-methyl-4-hydroxyphenylmethylsulfonium hexafluoroantimonate, benzyl-3-chloro-4-hydroxyphenylmethylsulfonium hexafluoroarsenate, benzyl-3-methyl-4-hydroxy-5-tert-butylphenylmethylsulfonium hexafluoroantimonate, 4-methoxybenzyl-4-hydroxyphenylmethylsulfonium hexafluorophosphate, dibenzyl-4-hydroxyphenylsulfonium hexafluoroantimonate, dibenzyl-4-hydroxyphenylsulfonium hexafluorophosphate, 4-acetoxyphenyldibenzylsulfonium hexafluoroantimonate, dibenzyl-4-methoxyphenylsulfonium hexafluoroantimonate, nitrobenzyl-4-hydroxyphenylimethylsulfonium hexafluoroantimonate, 3,5-dinitrobenzyl-4-hydroxyphenylmethylsulfonium hexafluoroantimonate, beta-naphthylmethyl-4-hydroxyphenylmethylsulfonium hexafluoroantimonate, etc. An example of compounds of formula III is diphenyl-cyclohexylsulfonium hexafluoroantimonate.

Commercially available aromatic sulfonium salts of the formula (1) include, for example, Sanaid SI-L85, Sanaid SI-L110, Sanaid SI-L145, Sanaid SI-L160, Sanaid SI-H15, Sanaid SI-H20, Sanaid SI-H25, Sanaid SI-H40, Sanaid SI-H60, Sanaid SI-60L, Sanaid SI-80L, Sanaid SI-100L, Sanaid SI-80, and Sanaid SI-100 (trademarks, products of Sanshin Chemical Industry KK), etc.

The compositions according to the invention preferably comprise, as the non-alkaline, inorganic filler (c), quartz flour, fused quartz, wollastonite, aluminium silicate (kyanite), glass powder or mica. Preferred fillers are quartz flour, wollastonite or kyanite. Particularly preferred are mixtures of fillers containing 3.5 to 4.5 times by weight more of the larger particles. Also preferred are, as larger particles, particles having a D50-value of between 15 and 25 µm.

In the context of the present invention non-alkaline refers to inorganic fillers which as a slurry in water show a pH-value of less than 8.

In order to extend the pot life and processability of the instant compositions, a preferred embodiment of the invention is a composition comprising in addition a polymerisation inhibitor in such a small amount that sufficient hardener-accelerator (b) unaffected by it remains to effect the desired curing of the composition.

Suitable polymerisation inhibitors are generally compounds which are more highly nucleophilic than the epoxy resin used and react with the protons in the composition or with the cations of the growing polymer chain more rapidly than do the monomers of the epoxy resin used, so that protons and cations cannot initiate polymerisation of this material.

Amines represent a group of polymerisation inhibitors which is particularly preferred. These amines should preferably have a $pK_a$ value of from 2 to 9 (25° C. in water). Primary, secondary and tertiary amines are suitable. In addition, the term "amine" here should also be taken to include heterocyclic compounds in which the amine nitrogen is a member of the heterocyclic ring, e.g. pyrazoles, imidazoles, pyrrolidines, pyrrolines, imidazolidines, imidazolines, pyrazolidine, pyrazolines, piperidines, piperazines, indolines, morpholines, quinuclidine, 1,8-diazabicyclo[5.4.0]undec-7-ene, 1,5-diazabicyclo[4.3.0]non-5-ene and 1,4-diazabicyclo[2.2.2]octane.

Particular preference is given to secondary and in particular tertiary amines, very particularly tribenzylamine, 1-methylimidazole, 1,8-diazabicyclo[5.4.0]undec-7-ene, 1,5-diazabicyclo[4.3.0]non-5-ene and 1,4-diazabicyclo[2.2.2]octane.

The polymerisation inhibitor may only be employed in an amount which is so low that the composition contains an excess of initiator which is sufficient for curing the material. Preferably, the excess of initiator ranges from at least 0.05 to 5% by weight, based on the epoxy resin. The excess may, however, be even higher. If conventional amounts of initiator are used, the inhibitor is employed in an amount which is considerably less than the amount equivalent to the free cations or acid protons which can be formed by the hardener accelerator. Thus, the polymerisation inhibitor can be employed, for example, in an amount of from 0.01 to 0.5 equivalents, based on the onium groups of the sulfonium salt (b2) and the polycarboxylic acid anhydride, and is particularly expediently employed in an amount of from 0.01 to 0.15 equivalents.

The present invention also relates to a second epoxy resin compositions comprising
(a) an epoxy resin having on average more than one 1,2-epoxide group in the molecule;
(b) a hardener-accelerator system comprising
 (bb1) a polycarboxylic acid anhydride; and
 (bb2) an optionally substituted imidazol; and
(c) an inorganic filler present as a mixture of at least two different particle sizes whereby the larger particles have a D50-value of between 11 and 25 µm and the smaller particles have a D50-value of between 4 and 10 µm and whereby the amount by weight of the filler having the larger particle sizes is at least twice the amount by weight of the filler having the smaller particle sizes. In a preferred embodiment, the hardener system consists essentially of (bb1) a polycarboxylic acid anhydride and (bb2) an optionally substituted imidazol.

The polycarboxylic acid anhydride in the second composition is preferably used in equimolar amounts referred to the epoxy resin equivalent.

The compositions according to the invention preferably comprise, as the anhydride (bb1), an anhydride of an aliphatic polycarboxylic acid such as maleic acid, oxalic acid, succinic acid, nonyl- or dodecylsuccinic acid, glutaric acid, adipic acid, pimelic acid, suberic acid, azelaic acid or dimerised or trimerised linoleic acid, a cycloaliphatic polycarboxylic acid such as tetrahydrophthalic acid, methylenedimethylenetetrahydrophthalic acid, hexachloroendo-methylenetetrahydrophthalic acid, 4-methyltetrahydrophthalic acid, hexahydrophthalic acid, or 4-methylhexahydrophthalic acid, an aromatic polycarboxylic acid such as phthalic acid, isophthalic acid, terephthalic acid, trimellitic acid, pyromellitic acid or benzophenone-3,3',4,4'-tetracarboxylic acid, or mixtures thereof. Further details and preferred anhydrides are as above for component (b1).

The compositions according to the invention preferably comprise, as the imidazol (bb2), imidazol, 2-methylimidazol, 2-ethylimidazol, 2-isopropylimidazol, 2-n-propylimidazol, 2-undecyl-1H-imidazol, 2-heptadecyl-1H-imidazol, 1,2-dimethylimidazol, 2-ethyl-4-methylimidazol, 2-phenyl-1H-imidazol, 4-methyl-2-phenyl-1H-imidazol, 2-phenyl-4-methylimidazol, 1-benzyl-2-methylimidazol, 1-cyanoethyl-2-methylimidazol, 1-cyanoethyl-2-ethyl-4-methylimidazol, 1-cyanoethyl-2-undecylimidazol, 1-cyanoethyl-2-phenylimidazol, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-[2'-methylimidazolyl(1')]-ethyl-s-triazine, 2,4-diamino-6-(2'-undecylimidazolyl)-ethyl-s-triazine, 2,4-diamino-6-[2'-ethyl-4-imidazolyl-(1')]-ethyl-s-triazine, 2,4-diamino-6-[2'-methylimidazolyl-(1')]-ethyl-s-triazine isocyanuric acid addition products, 2-phenylimidazol isocyanuric acid addition products, 2-methylimidazol isocyanuric acid addition products, 2-phenyl-4,5-dihydroxymethylimidazol, 1,2-phenyl-4-methyl-5-hydroxymethylimidazol, 1-cyanoethyl-2-phenyl-4,5-di(2-cyanoethoxy)methylimidazol, 1-dodecyl-2-methyl-3-benzylimidazolium chloride, 1-benzyl-2-phenylimidazole hydrochloride, 1-benzyl-2-phenylimidazolium trimellitate or the like.

The compositions according to the invention preferably comprise, as the inorganic filler (cc), quartz flour, fused quartz, aluminium oxide, glass powder, mica, kaolin, dolomite, kyanite, and wollastonite. Preferred fillers are quartz flour, fused quartz aluminium oxide and wollastonite. Particularly preferred are mixtures of fillers containing 3.5 to 4.5 times by weight more of the larger particles. Also preferred are, as larger particles, particles having a D50-value of between 15 and 25 µm.

The compositions according to the invention preferably contain, per 100 parts by weight of the sum of the components (a), (b) and (c), components (a) and (b) in amounts of 40-60 parts by weight and component (c) in amounts of 60-40 parts by weight and more preferably components (a) and (b) in amounts of 40-50 parts by weight and component (c) in amounts of 60-50 parts by weight.

The component (b1) is advantageously employed in the composition according to the invention in amounts of 0.01 to 10% by weight, preferably 0.1 to 5% by weight and in particular 0.1 to 2.5% by weight, based on the amount of components (a), (b) and (c).

The component (b2) or (bb2), respectively, is advantageously employed in the compositions according to the invention in amounts of 0.01 to 10% by weight, preferably 0.1 to 5% by weight and in particular 0.1 to 2.5% by weight, based on the amount of components (a), (b) and (c).

The compositions according to the invention can also contain other known additives usually employed in the art of polymerizable materials. Examples of such additives are pigments, dyes, flame retardant substances, antistatics, adhesion promoters, flow control agents, antioxidants and light stabilizers.

The compositions according to the invention can be employed quite generally for the production of cured products and can be used in the formulation suitable for the particular specific field of use, for example as coating compositions, paints, pressing compositions, dipping resins, casting resins, potting resins, impregnating resins, laminating resins, 1- or 2-component adhesives or matrix resins. Use as a casting or potting resin is particularly preferred.

The present invention thus also relates to the use of above described epoxy resin compositions in a casting process, whereby said process comprises
 (A) mixing the epoxy resin compositions according to the invention at temperature of 40-100° C.;
 (B) casting at a temperature of 40-100° C.;
 (C) curing the so-obtained casts at a temperature not exceeding 160° C. for a time not exceeding one hour; and optionally
 (D) demoulding.

The mixing and casting temperature is preferably 50 to 80° C. and most preferably 55 to 70° C. The curing time is preferably 15 to 50 and particularly preferred 20 to 40 minutes. The curing temperature is preferably 60 to 160° C. and most preferably 70 to 140° C. The temperature for curing can be raised stepwise, which is a preferred embodiment of the invention.

The present invention thus also relates to a casting process, as described above, whereby a composition according to the instant invention is used.

The process according to the invention preferably comprises as step (A), a mixing step carried out with a static mixer. Preferably the temperature is 60-70° C. Preferably, the components are degassed optionally under vacuum prior to the mixing step.

The process according to the invention preferably comprises as step (B), a casting step whereby a transformer such as a car ignition coil is casted. Preferably the transformer is preheated, for example to a temperature of 80-120° C., and the casting is carried out under a slight vacuum of 46 mbar. Especially preferred the casting temperature is 60-70° C. In order to accelerate the impregnation process, it may be advantages to apply pressure such as 4-6 bar after release of vacuum. Said pressure may be maintained during curing.

The process according to the invention comprises as step (C), a curing step, whereby the casting article is kept at a temperature which is equal or up to 10° C. higher than the casting temperature, followed by increasing the temperature to 120-150° C. and keeping the casted article at that temperature for the remaining curing time. Preferably, the article is kept at the temperature of 120-150° C. for not more than half of the total curing time.

The process according to the invention may optionally comprise a demoulding step (D). In case of a potting process said step is however not carried out as the form is not re-used.

The following examples explain the invention in more detail.

The process according to the invention results within a extremely short total curing time in impregnated articles without voids, whereby the epoxy resin is in its finally cured state. The prepared articles such as transformers must not be post-treated (post-cured) and are ready for end uses.

EXAMPLES

The following compounds are used:
ER1: liquid diglycidylether of bisphenol A, epoxy value 5.3 Eq/kg, viscosity 1200 mPas at 25° C.
ER2: liquid diglycidylether of bisphenol A and F, epoxy value 5.6 Eq/kg, viscosity 7000 mPas at 25° C.
A1: Methylhexahydrophthalic anhydride
A2: Methyltetrahydrophthalic anhydride
A3: Mixture of Methylhexahydrophthalic anhydride and Hexahydrophthalic anhydride
S1: Dibenzylphenylsulfonium hexafluoroantimonat
F1: silica flour with a particle size distribution D50: 20 µm, D95: 70 µm, D10: 2.5 µm
F2: silica flour with a particle size distribution D50: 16 µm, D95: 50 µm, D10: 2.0 µm
F3: silica flour with a particle size distribution D50: 8 µm, D95: 25 µm, D10: 1.7 µm
F4: silica flour with a particle size distribution D50: 2 µm, D95: 6 µm, D10: <1 µm
F5: Kyanite with a particle size distribution D50: 18, D95: 60 µm, D10: 2.2 µm
I1: 1-Methylimidazole Preparation of the Epoxy Resin Compositions Examples 1 to 8, Table 1 and Comparative Examples 1 to 4, Table 2

The liquid epoxy resin (ER1 or ER2) and the inhibitor (I1) are mixed at 60-70° C. and with further stirring the filler F1 to F5) is added stepwise. A solution prepared in advance at 60° C. from the anhydride (A1 to A3) and the sulfonium salt (S1) is added and stirred under a vacuum of 1 mbar at 60-70° C. The resulting homogenous hot casting resin mixture is used for the evaluation methods as described below.

TABLE 1

| | Examples | | | | | | | |
|---|---|---|---|---|---|---|---|---|
| | 1 | 2 | 3 | 4 | 5 | 6 | 7 | 8 |
| ER1 | 40.49 | | 40.49 | 40.49 | | 40.49 | 40.49 | 40.49 |
| ER2 | | 40.49 | | | 40.49 | | | |
| A1 | 4.10 | 4.10 | | | | 4.10 | 4.10 | 4.10 |
| A2 | | | 4.10 | | | | | |

TABLE 1-continued

| | Examples | | | | | | | |
|---|---|---|---|---|---|---|---|---|
| | 1 | 2 | 3 | 4 | 5 | 6 | 7 | 8 |
| A3 | | | | 4.10 | 4.10 | | | |
| S1 | 0.40 | 0.40 | 0.40 | 0.40 | 0.40 | 0.40 | 0.40 | 0.40 |
| F1 | | | | | | 44.00 | | 38.00 |
| F2 | 44.00 | 44.00 | 44.00 | 44.00 | 44.00 | | | |
| F3 | 11.00 | 11.00 | 11.00 | 11.00 | 11.00 | 11.00 | 12.00 | 14.00 |
| F4 | | | | | | | | 3.00 |
| F5 | | | | | | | 43.00 | |
| I1 | 0.01 | 0.01 | 0.01 | 0.01 | 0.01 | 0.01 | 0.01 | 0.01 |
| Gap filling | + | + | + | + | + | ○ | + | ○ |
| Impregnation | + | + | + | + | + | + | + | + |
| Sedimentation | + | + | + | + | + | ○ | + | + |

TABLE 2

Comparative formulations with respect to example 1, Table 1

| | Comparative Examples | | | |
|---|---|---|---|---|
| | 1 | 2 | 3 | 4 |
| ER1 | 40.49 | 40.49 | 40.49 | 40.49 |
| A1 | 4.10 | 4.10 | 4.10 | 4.10 |
| S1 | 0.40 | 0.40 | 0.40 | 0.40 |
| F1 | | 44.00 | 11.00 | |
| F2 | 55.00 | | | |
| F3 | | | 44.00 | 43.00 |
| F4 | | 11.00 | | |
| F5 | | | | 12.00 |
| I1 | 0.01 | 0.01 | 0.01 | 0.01 |
| Gap filling | ○ | ○ | ○ | ○ |
| Impregnation | ○ | − | − | − |
| Sedimentation | − | + | + | + |

Gap Filling

The gap filling property of the liquid epoxy resin composition is determined by the following procedure. A metal form having a cavity of approximately 10 ml and a gap extending from said cavity and having a length of 150 mm and a width of 0.5 mm is heated to 60° C. 10 g of the epoxy resin composition, also heated to 60° C., is poured into the metal form. After 10 min the advancement of the composition in the gap is measured. The rating is as follows:

+: >100 mm o: 80-100 mm

−: <80 mm

Impregnation of a High Voltage Coil Wire

High voltage coils of different manufacturers are filled with the epoxy resin composition at a temperature of 60° C. and under vacuum. After curing (25 min/73° C. and 10 min/73° C.-130° C. and 25 min/130° C.), the coils are cut longitudinally in halves. Under a microscope the impregnation of the high voltage windings is examined. The rating is as follows:

+: (number of holes/number of windings)*100=>99% o: (number of holes/number of windings)*100=95-99%

−: (number of holes/number of windings)*100<95%

Sedimentation Stability

A plastic tube (12 mm diameter, 90 mm height) is filled with the epoxy resin composition. After curing (25 min/73° C. and 10 min/73° C.-130° C. and 25 min/130° C.), probes are taken from the top and from the bottom. The filter content of the probes is determined by ashing. The difference in the filler content of the bottom and the top probes is a measure of the sedimentation stability. The rating is as follows:

+: difference <3%
o: difference 3-7%
−: difference >7%

Preparation of the Epoxy Resin Compositions

Examples 9 to 15, Table 3, and Comparative Examples 5 to 8, Table 4

The liquid epoxy resin (ER1 or ER2), anhydride (A1 to A3) and imidazole (I1) are mixed at 50-60° C. and with further stirring the filler (F1 to F5) is added stepwise. The mixture is stirred under a vacuum of 1 mbar at 50-60° C. The resulting homogenous hot casting resin mixture is used for the evaluation methods as described below.

TABLE 3

|  | Examples | | | | | | |
| --- | --- | --- | --- | --- | --- | --- | --- |
|  | 9 | 10 | 11 | 12 | 12 | 14 | 15 |
| ER1 | 24.20 | 24.30 | 24.50 |  | 24.20 | 24.20 | 24.20 |
| ER2 |  |  |  | 23.90 |  |  |  |
| A1 | 20.60 |  |  | 20.90 | 20.60 | 20.60 | 20.60 |
| A2 |  | 20.50 |  |  |  |  |  |
| A3 |  |  | 20.30 |  |  |  |  |
| S1 |  |  |  |  |  |  |  |
| F1 |  |  |  |  |  | 44.00 |  |
| F2 | 44.00 | 44.00 | 44.00 | 44.00 | 44.00 |  |  |
| F3 | 11.00 | 11.00 | 11.00 | 11.00 | 11.00 | 11.00 | 12.00 |
| F4 |  |  |  |  |  |  |  |
| F5 |  |  |  |  |  |  | 43.00 |
| I1 | 0.20 | 0.20 | 0.20 | 0.20 | 0.20 | 0.20 | 0.20 |
| Gap filling | + | + | + | + | + | o | + |
| Impregnation | + | + | + | + | + | + | + |
| Sedimentation | + | + | + | + | + | o | + |

TABLE 4

| Comparative formulations with respect to example 9, Table 3 | | | | |
| --- | --- | --- | --- | --- |
|  | Comparative Examples | | | |
|  | 5 | 6 | 7 | 8 |
| ER1 | 24.20 | 24.20 | 24.20 | 24.20 |
| A1 | 20.60 | 20.60 | 20.60 | 20.60 |
| S1 |  |  |  |  |
| F1 |  | 44.00 | 11.00 |  |
| F2 | 55.00 |  |  |  |
| F3 |  |  | 44.00 | 43.00 |
| F4 |  | 11.00 |  |  |
| F5 |  |  |  | 12.00 |
| I1 | 0.20 | 0.20 | 0.20 | 0.20 |
| Gap filling | o | o | o | o |
| Impregnation | o | − | − | − |
| Sedimentation | − | + | + | + |

The invention claimed is:

1. An epoxy resin composition consisting of:
  (a) an epoxy resin having on average more than one 1,2-epoxide groups in the molecule;
  (b) a hardener-accelerator system consisting of
    (b1) a polycarboxylic acid anhydride; and
    (b2) a sulfonium salt;
  (c) a non-alkaline, inorganic filler present as a mixture of at least two different particle sizes whereby the larger particles have a D50-value of between 11 and 25 µm and the smaller particles have a D50-value of between 4 and 10 µm and whereby the amount by weight of the filler having the larger particle sizes is at least twice the amount by weight of the filler having the smaller particle sizes and wherein the inorganic filler (c) is selected from quartz flour, fused quartz, wollastonite, aluminium silicate, glass powder mica and a mixture thereof; and optionally
  (d) a polymerization inhibitor, pigment, dye, flame retardant, antistatic, adhesion promoter, flow control agent, antioxidant or light stabilizer.

2. A composition according to claim 1, wherein the epoxy resin is selected from a novolak epoxy resin or a diglycidyl ether of a bisphenol.

3. A composition according to claim 1, wherein component (b1) is a cycloaliphatic polycarboxylic anhydride or a mixture thereof.

4. A composition according to claim 1, wherein the sulfonium salt (b2), is selected from a compound of formulae (I) to (V)

(I)

(II)

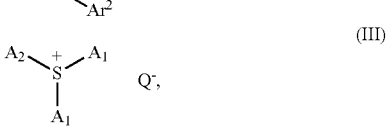

(III)

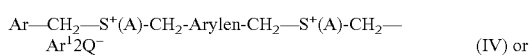

(IV) or

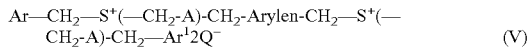

(V)

or any mixture thereof, in which A is $C_1$-$C_{12}$ alkyl, $C_3$-$C_8$ cycloalkyl, $C_4$-$C_{10}$ cycloalkylalkyl, phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

Ar, $Ar^1$ and $Ar^2$, independently of one another, are each phenyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms or is naphthyl which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

arylene is phenylene which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms or naphthylene which is unsubstituted or mono- or polysubstituted by $C_1$-$C_8$ alkyl, $C_1$-$C_4$ alkoxy, halogen, nitro, phenyl, phenoxy, alkoxycarbonyl having 1-4 C atoms in the alkoxy radical or acyl having 1-12 C atoms;

Q is $SbF_6$, $AsF_6$ or $SbF_5OH$, $A_1$ has independently the meaning of Ar, and $A_2$ $C_1$-$C_{12}$ alkyl, $C_3$-$C_8$ cycloalkyl, $C_4$-$C_{10}$ cycloalkylalkyl.

5. An epoxy resin composition consisting of:
   (a) an epoxy resin having on average more than one 1,2-epoxide group in the molecule;
   (b) a hardener-accelerator system consisting of
      (bb1) a polycarboxylic acid anhydride; and
      (bb2) an optionally substituted imidazol;
   (c) an inorganic filler present as a mixture of at least two different particle sizes whereby the larger particles have a D50-value of between 11 and 25 μm and the smaller particles have a D50-value of between 4 and 10 μm and whereby the amount by weight of the filler having the larger particle sizes is at least twice the amount by weight of the filler having the smaller particle sizes and wherein the inorganic filler (c) is selected from quartz flour, fused quartz, wollastonite, aluminium silicate, glass powder mica and a mixture thereof; and optionally
   (d) a polymerization inhibitor, pigment, dye, flame retardant, antistatic, adhesion promoter, flow control agent, antioxidant or light stabilizer.

6. A composition according to claim 5, wherein the composition contains, per 100 parts by weight of the sum of the components (a), (b) and (c), components (a) and (b) in amounts of 40-60 parts by weight and component (c) in amounts of 60-40 parts by weight.

7. A composition according to claim 5, wherein the polycarboxylic acid anhydride is contained in equimolar amounts referred to the epoxy resin equivalent.

8. A composition according to claim 5, wherein the component (b1) is contained in amounts of 0.01 to 10% by weight, based on the amount of components (a), (b) and (c).

9. A composition according to claim 5, wherein the components (bb2) is present in an amounts of 0.01 to 10% by weight, based on the amount of components (a), (b) and (c).

10. A casting process, which comprises:
    (A) mixing an epoxy resin composition consisting of
        (a) an epoxy resin having on average more than one 1,2-epoxide groups in the molecule;
        (b) a hardener-accelerator system consisting of
        (b1) a polycarboxylic acid anhydride; and
        (b2) a sulfonium salt;
        (c) a non-alkaline, inorganic filler present as a mixture of at least two different particle sizes whereby the larger particles have a D50-value of between 11 and 25 μm and the smaller particles have a D50-value of between 4 and 10 μm and whereby the amount by weight of the filler having the larger particle sizes is at least twice the amount by weight of the filler having the smaller particle sizes and wherein the inorganic filler (c) is selected from quartz flour, fused quartz, wollastonite, aluminium silicate, glass powder mica and a mixture thereof; and optionally
        (d) a polymerization inhibitor, pigment, dye, flame retardant, antistatic, adhesion promoter, flow control agent, antioxidant or tight stabilizer at a temperature of 40-100° C.;
    (B) casting at a temperature of 40-100° C.;
    (C) curing the so-obtained casting at a temperature not exceeding 160° C. for a time not exceeding one hour; and optionally (D) demoulding.

11. A casting resin for use in the manufacture of transformers consisting of
    (a) an epoxy resin having on average more than one 1,2-epoxide groups in the molecule;
    (b) a hardener-accelerator system consisting of
    (b1) a polycarboxylic acid anhydride; and
    (b2) a sulfonium salt; and
    (c) a non-alkaline, inorganic filler present as a mixture of at least two different particle sizes whereby the larger particles have a D50-value of between 11 and 25 μm and the smaller particles have a D50-value of between 4 and 10 μm and whereby the amount by weight of the filler having the larger particle sizes is at least twice the amount by weight of the filler having the smaller particle sizes and wherein the inorganic filler (e) is selected from quartz flour, fused quartz, wollastonite, aluminium silicate, glass powder mica and a mixture thereof; and optionally
    (d) a polymerization inhibitor, pigment, dye, flame retardant, antistatic, adhesion promoter, flow control agent, antioxidant or light stabilizer.

\* \* \* \* \*